Figure 5:
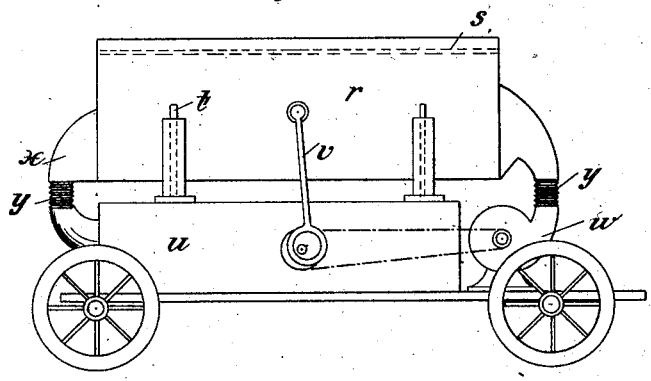

S. WŸNBERG.
PROCESS FOR TREATING SUGAR CANE FOR SUGAR AND WAX.
APPLICATION FILED JAN. 18, 1910.
1,009,615.
Patented Nov. 21, 1911.
2 SHEETS—SHEET 1.
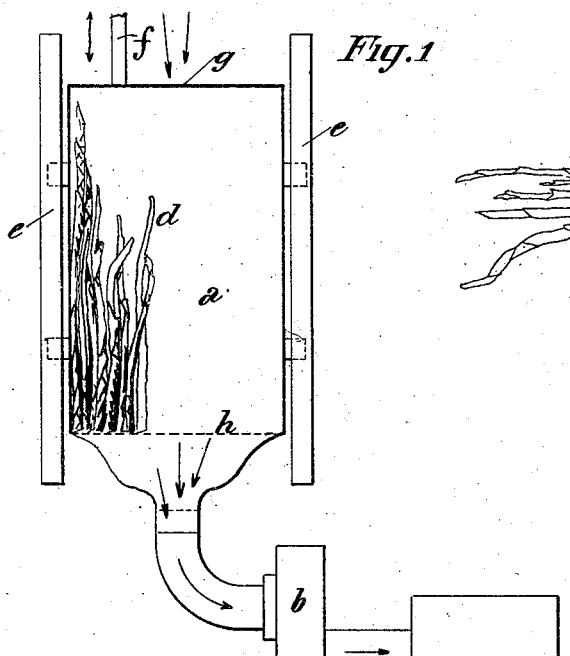
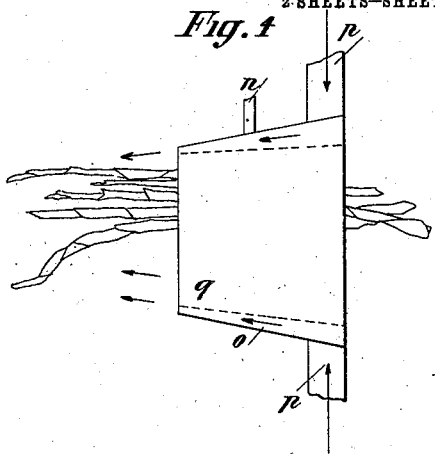
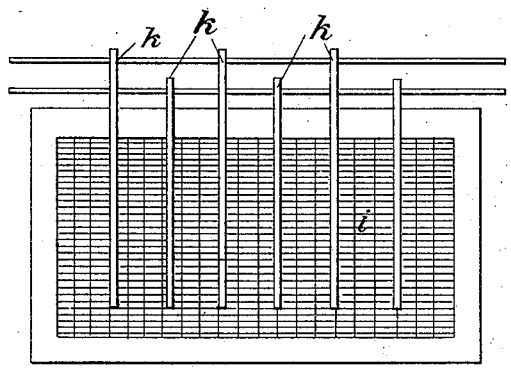
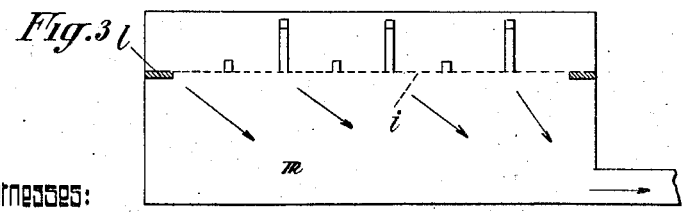
Witnesses:
C. H. Potter.
C. Daniels.
Inventor:
Simon Wijnberg
by Byrnes Townsend & Brickenstein

UNITED STATES PATENT OFFICE.

SIMON WŸNBERG, OF AMSTERDAM, NETHERLANDS.

PROCESS FOR TREATING SUGAR-CANE FOR SUGAR AND WAX.

1,009,615. Specification of Letters Patent. Patented Nov. 21, 1911.

Application filed January 18, 1910. Serial No. 538,664.

*To all whom it may concern:*

Be it known that I, SIMON WŸNBERG, engineer, citizen of the Netherlands, subject of the Queen of the Netherlands, residing at 141 Sarphatiestraat, Amsterdam, in the Kingdom of the Netherlands, have invented certain new and useful Improvements in Processes for Treating Sugar-Cane for Sugar and Wax, of which the following is a full, clear, and exact description.

On the surface of the stalks of several plants, such as sugar cane and candilla plants, there exists a film of wax which, particularly with certain kinds of sugar cane, is of considerable thickness and is generally thickest close to the joint. When the sugar cane is treated for extracting sugar, the wax on the stalks becomes mixed with the juice and in the various processes of evaporating, filter-pressing, centrifugal separation and the like, acts as an impediment and reduces the yield in sugar because of the wax adhering to numerous particles of sugar and retaining it in the precipitated residue in the filter-press.

The present invention relates to a process for removing and recovering this wax directly from the cane stalks, and is based on the fact that the wax is hard and brittle and forms a thin layer on the surface of the cane stalks, which layer may be easily removed without damaging the stalks. This removal is effected by subjecting the cane stalks to a violent knocking or shaking motion, such vibratory motion being transmitted to the cane stalks either directly or indirectly. I have found it desirable to use a current of air in connection with the vibratory motion imparted to the hard and brittle wax to cause it to break off and fall down, this current of air being directed at a suitable angle and with proper force against the stalks, the separated particles of wax being removed and recovered in any suitable manner.

For sugar cane, the current of air together with a comparatively slight vibration will be sufficient to remove a part of the wax as the wax adheres but loosely when the stalks are fully grown, and in a properly conducted factory chiefly full-grown stalks are used. The stalks may be subjected to the wax-removing operation before they are taken to the crushing mills, or the latter may be arranged in such manner as to allow of simultaneously treating the stalks to remove the wax, and grinding them.

As the apparatus required is comparatively simple, the wax may be removed on the way from the plantation to the factory, as will appear from the description of the apparatus.

Figure 6:
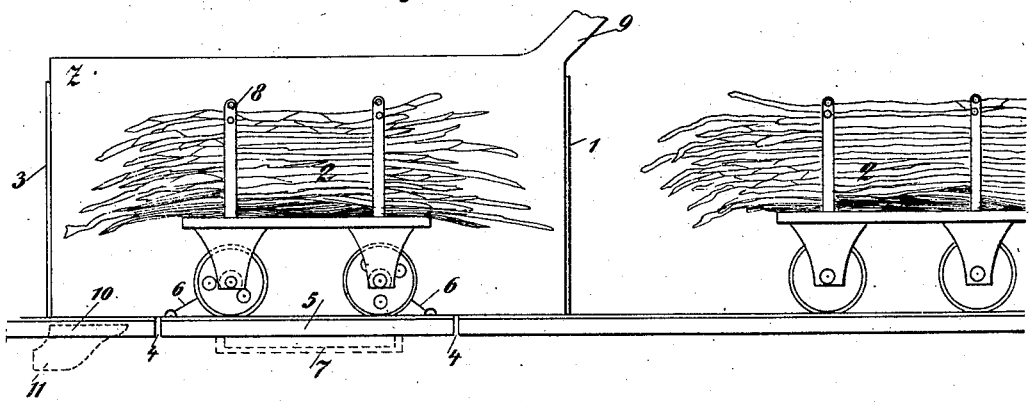

In the accompanying drawings illustrating a few of the possible means by which the process may be carried out—Figure 1 shows a simple form of apparatus, partly diagrammatically and partly in section; Fig. 2 is a plan view of another type of apparatus; Fig. 3 is a vertical longitudinal section of Fig. 2; Fig. 4 is a side elevation of another form which the apparatus may take; Fig. 5 is a side elevation of a portable modification of the apparatus; and Fig. 6 illustrates somewhat diagrammatically a side view of still another system which may be employed.

Referring to Fig. 1, $a$ is a vibratory container adapted to receive the stalks to be treated, the chamber being guided in its movement by suitable rails $e$. The motion may be imparted to the container from above, below, or at the sides, it being shown here as receiving movement from above, through arm $f$. $b$ represents a suction device for transferring the waxladen air entering container $a$ through opening $g$, and passing through supporting-screen $h$, to the receiving chamber $c$, as will be readily understood from the direction of the arrows.

In the apparatus shown in Figs. 2 and 3, $i$ represents a supporting-grate for the stalks, and $k$, $k$ mechanism for beating the latter for effecting the removal of the wax, which then falls through the grate into collecting box $m$ provided with a suction outlet as shown. The working parts of the beating mechanism as also the supporting-grate may be either rigid or elastic, or may have a suitable spring action. One or several beaters may be provided, and the grate may be given a reciprocating movement, if desired.

As shown in Fig. 4, the apparatus may be adapted for the treatment of each stalk independently or of bunches. In this form, $o$ represents a double walled tube forming a passage through which the stalks are moved and provided with shaking means $n$. Between the walls of this tube an air-blast passes, the air entering at $p, p$, and emerging with sufficient force at the opening $q$ where it impinges at a suitable angle against the stalks passing through the center of the tube.

In Fig. 5 is shown a device of portable form, in which the entire plant is mounted upon a suitable truck. As shown, $r$ represents the container for the cane-stalks, said container being provided with a lid $s$, vibrating mechanism $v$, and guide-rails $t$. $u$ represents an adjacent receptacle adapted to receive the removed wax. An air-blast is obtained by means of a fan $w$, and this blast is supplied to the charge of stalks in container $r$ through a flexible connection $y$ at the right-hand end. The wax-laden air passes from the stalk-container to the wax-receiving chamber $u$ through outlet $x$ and a second flexible pipe $y$. The passage $x$ may be provided with a screen or the like to prevent the stalks from following the course of the air-current and consequently choking the passage; also the container $r$ may have a sieve bottom, so that the particles of wax will fall directly into the collecting box upon separation from the stalks.

Fig. 6 illustrates how an entire truck-load of stalks may be treated at once. $z$ represents a closed housing, long enough to receive one or more trucks, wagons, or cars 2, and provided with an inlet gate 1 and an outlet gate 3, through which the vehicles enter and leave the chamber $z$. At 4, 4 the rails upon which the trucks roll are interrupted, and the portions of the rails between these breaks are movable and receive a vibratory motion through shaking mechanism 7. Hooks 6, 6 are provided for the purpose of blocking and securing the wheels of the truck against longitudinal movement during the vibrating action. The stalks may be fastened down upon the truck by cords or straps attached to uprights 8. A current of air enters the chamber at 9 and carries the removed particles of wax through a screen 10 in the floor and outlet 11 to a collecting bo, not shown. The floor of the vehicle may be of grating, for the purpose of facilitating the removal of the particles of wax from the stalks.

I claim:—

1. The process of removing wax and other substances from the surface of stalks of sugar cane, which consists in subjecting the stalks to the action of such forces that the wax and other substances will break off, and collecting the wax.

2. The process of treating sugar cane, which consists in subjecting the sugar cane stalks to the action of vibrations to cause the particles of wax to break off, and collecting the wax.

3. The process of treating sugar cane, which consists in subjecting the sugar cane stalks to the action of vibrations to cause the particles of wax to break off, and collecting the wax.

4. The process of treating sugar cane, which consists in subjecting the sugar cane stalks to the action of vibrations to break off the wax and simultaneously subjecting the stalks to the action of a current of air, substantially as described.

5. The process of treating sugar cane, which consists in subjecting the sugar cane stalks to the action of vibrations to break off the wax and simultaneously subjecting the stalks to the action of a current of air, and collecting the wax.

In witness whereof, I subscribe my signature, in presence of two witnesses.

SIMON WŸNBERG.

Witnesses:
T. N. HULSHOFF,
A. HUIDEKOPER.